(12) United States Patent
Shintaku et al.

(10) Patent No.: US 12,062,824 B2
(45) Date of Patent: *Aug. 13, 2024

(54) METHOD AND APPARATUS FOR PRODUCING MEMBRANE ELECTRODE ASSEMBLY

(71) Applicant: TORAY INDUSTRIES, INC., Tokyo (JP)

(72) Inventors: Yuta Shintaku, Otsu (JP); Ryuta Sakashita, Otsu (JP); Daisuke Izuhara, Otsu (JP); Kiyoshi Minoura, Otsu (JP); Mei Kumagai, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/785,183

(22) PCT Filed: Dec. 21, 2020

(86) PCT No.: PCT/JP2020/047642
§ 371 (c)(1),
(2) Date: Jun. 14, 2022

(87) PCT Pub. No.: WO2021/132138
PCT Pub. Date: Jul. 1, 2021

(65) Prior Publication Data
US 2023/0027116 A1 Jan. 26, 2023

(30) Foreign Application Priority Data
Dec. 23, 2019 (JP) .................. 2019-231592

(51) Int. Cl.
*H01M 8/1004* (2016.01)
*H01M 4/88* (2006.01)
*H01M 4/90* (2006.01)

(52) U.S. Cl.
CPC ......... *H01M 8/1004* (2013.01); *H01M 4/886* (2013.01); *H01M 4/8882* (2013.01); *H01M 4/8896* (2013.01); *H01M 4/9083* (2013.01)

(58) Field of Classification Search
None
See application file for complete search history.

(56) References Cited

U.S. PATENT DOCUMENTS

2004/0163760 A1* 8/2004 Masaka ............... H01M 8/1081
  156/305
2005/0173061 A1* 8/2005 Xie ..................... H01M 8/1004
  156/309.3
2022/0302486 A1* 9/2022 Bonakdarpour .... H01M 4/8668

FOREIGN PATENT DOCUMENTS

JP 2004-253267 A 9/2004
JP 2005-158518 A 6/2005
JP 2005-222894 A 8/2005

OTHER PUBLICATIONS

JP2005158518A—Machine Translation (Year: 2005).*

(Continued)

*Primary Examiner* — Brian R Ohara
*Assistant Examiner* — Patrick Marshall Greene
(74) *Attorney, Agent, or Firm* — Birch, Stewart, Kolasch & Birch, LLP

(57) ABSTRACT

A method of manufacturing a membrane-electrode assembly including an electrolyte membrane and a catalyst layer-formed gas diffusion layer bonded to the electrolyte membrane, the method including: a liquid application step of applying, in the atmosphere, a liquid to only a surface of the catalyst layer before bonding; and a thermocompression bonding step of bonding, to the electrolyte membrane, the catalyst layer-formed gas diffusion layer to which the liquid is applied, by thermocompression bonding. Provided is a method of manufacturing a membrane-electrode assembly (Continued)

including a polymer electrolyte membrane and a catalyst layer-formed gas diffusion layer bonded to the polymer electrolyte membrane, in which the manufacturing method can achieve both the relaxation of thermocompression bonding conditions and the improvement of adhesion between the catalyst layer-formed gas diffusion layer and the electrolyte membrane with high productivity.

12 Claims, 3 Drawing Sheets

(56) References Cited

OTHER PUBLICATIONS

International Search Report, issued in PCT/JP2020/047642, PCT/ISA/210, dated Feb. 16, 2021.
Written Opinion of the International Searching Authority, issued in PCT/JP2020/047642, PCT/ISA/237, dated Feb. 16, 2021.

\* cited by examiner

[Fig. 1]
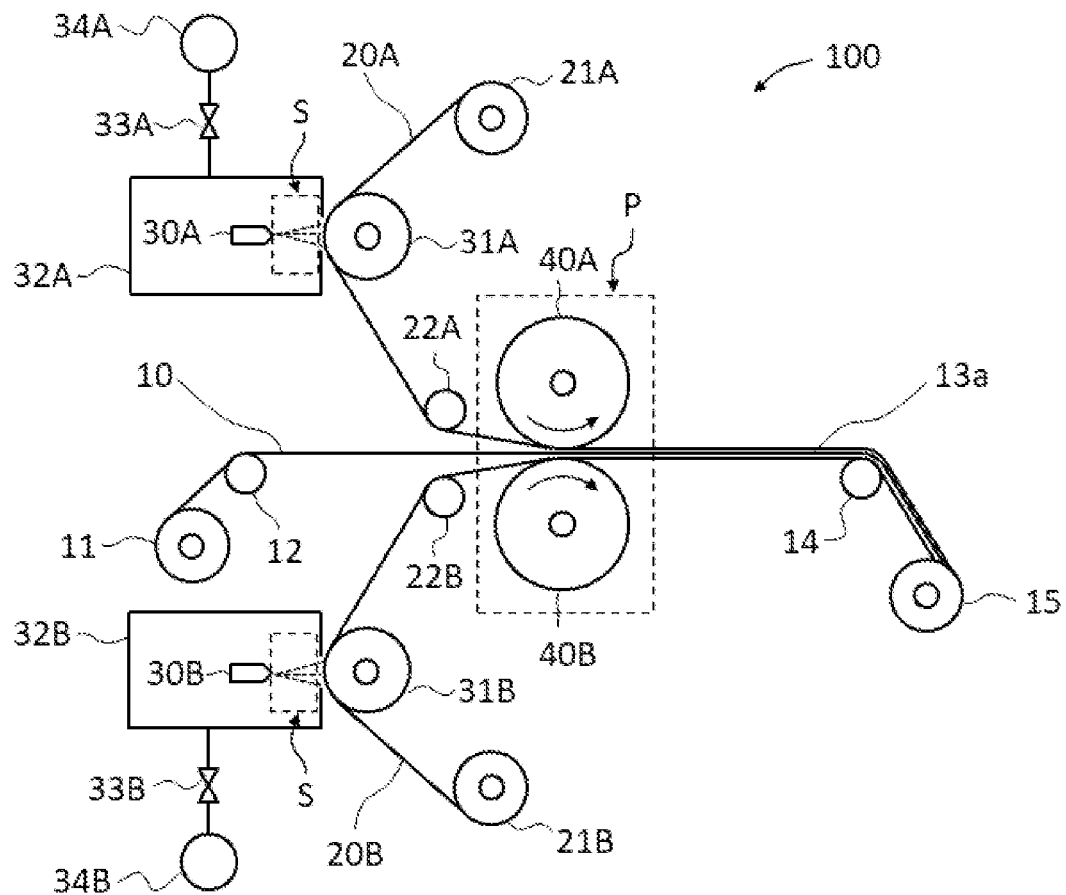
[Fig. 2]
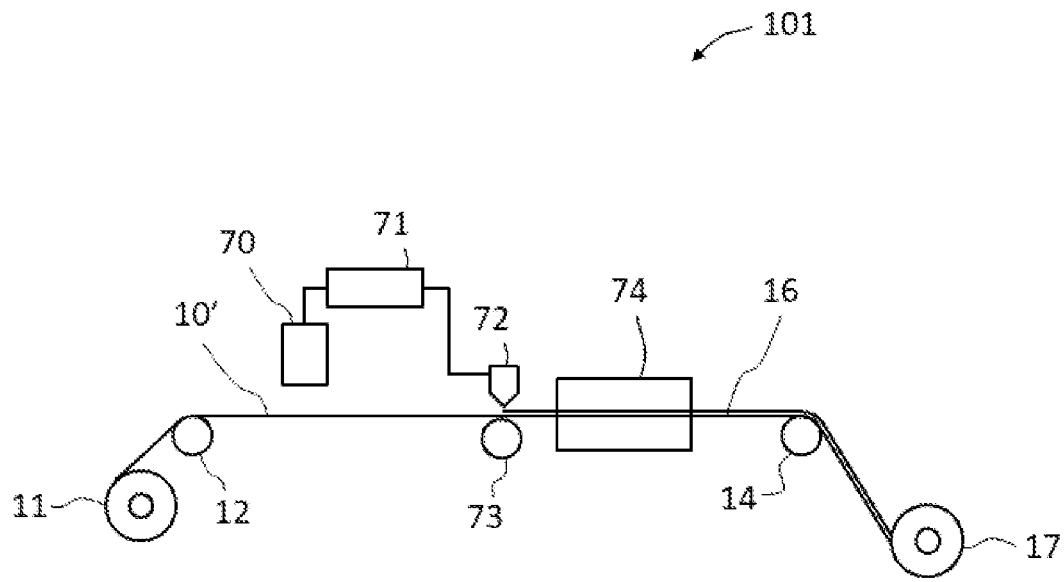

[Fig. 3]
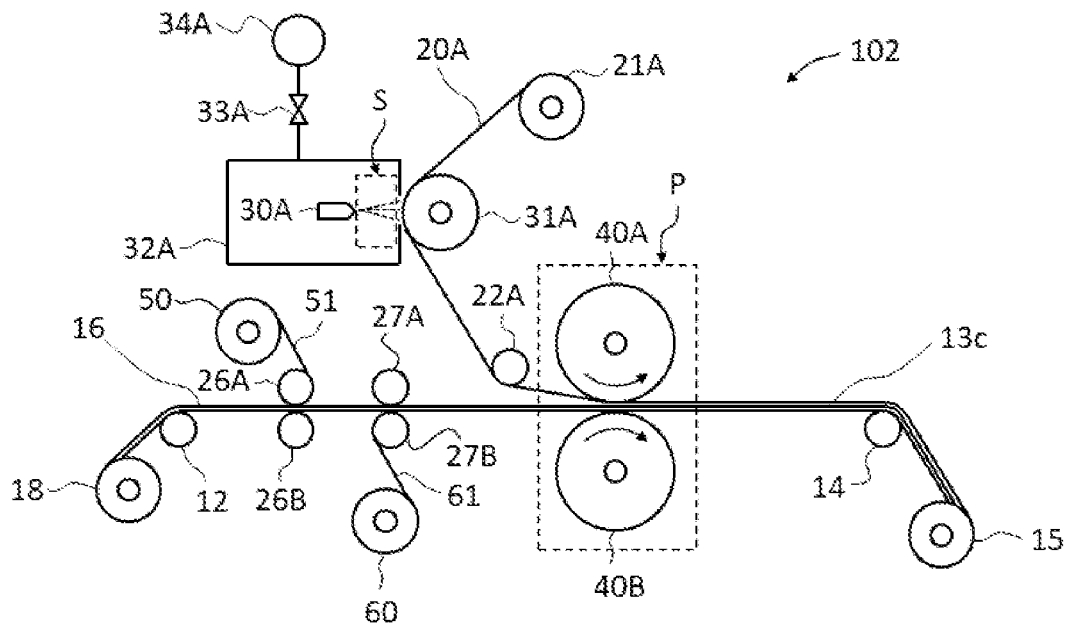
[Fig. 4]
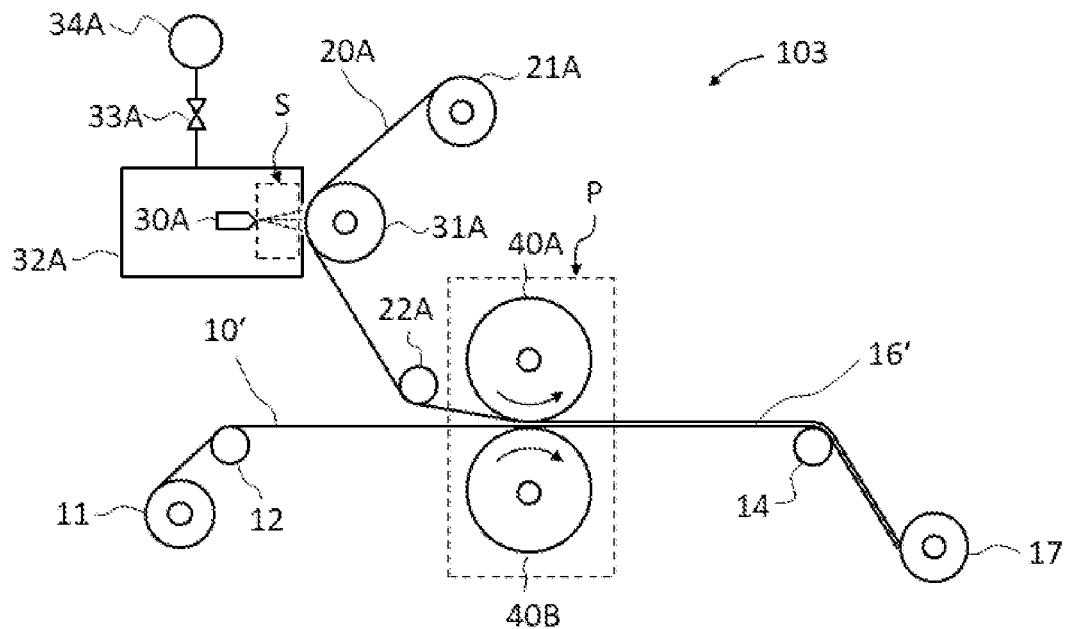

[Fig. 5]
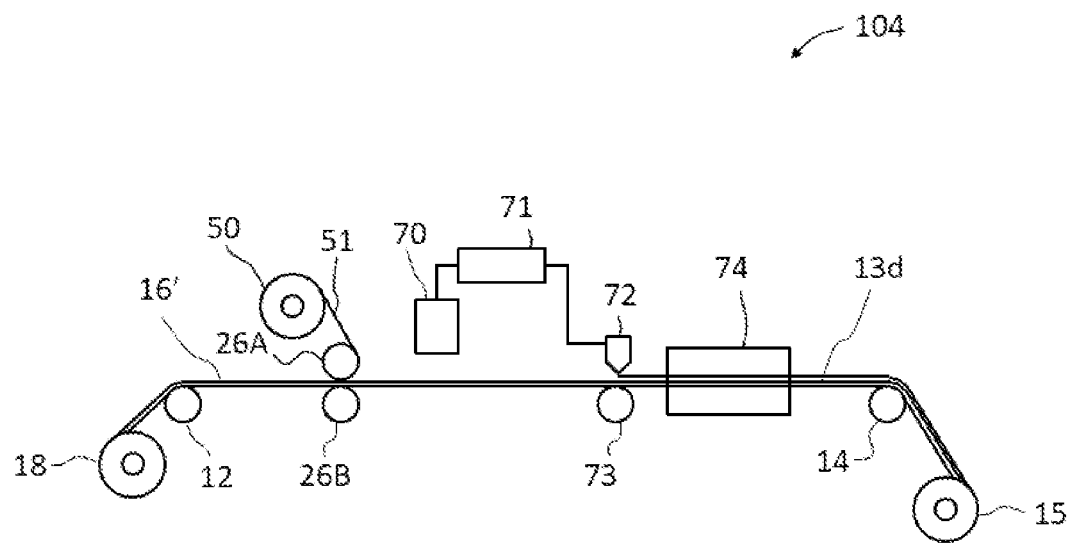
[Fig. 6]
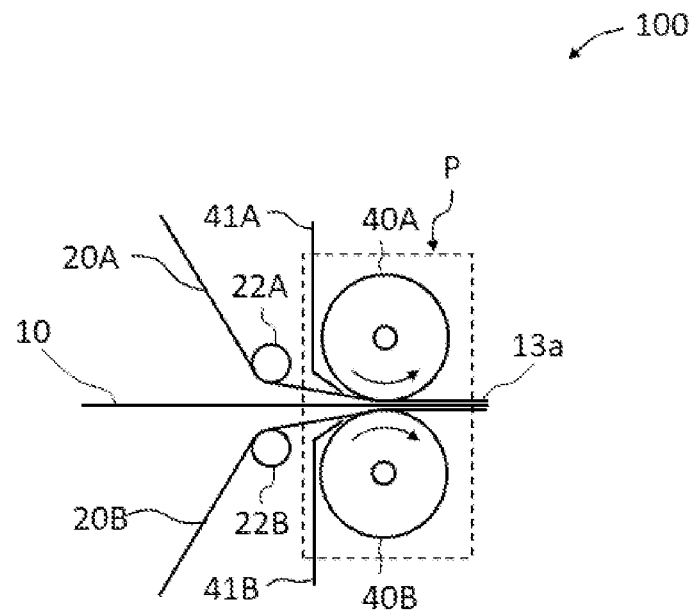

METHOD AND APPARATUS FOR PRODUCING MEMBRANE ELECTRODE ASSEMBLY

TECHNICAL FIELD

The present invention relates to a method of manufacturing a "membrane-electrode assembly", which is one embodiment of a member which includes a polymer electrolyte membrane and a catalyst layer bonded to the polymer electrolyte membrane, that is, a membrane-catalyst assembly, which is used in electrochemical devices such as polymer electrolyte fuel cells, as well as to a device for manufacturing the membrane-electrode assembly.

BACKGROUND ART

Fuel cells are a kind of power generator from which electric energy is extracted by electrochemical oxidation of a fuel such as hydrogen or methanol, and have recently attracted attention as a clean energy source. Above all, polymer electrolyte fuel cells have a low standard operating temperature of around 100° C. and a high energy density. Therefore, polymer electrolyte fuel cells are expected to be widely applied to relatively small distributed power generation facilities as well as to power generators for mobile objects such as automobiles and ships. Polymer electrolyte membranes (hereinafter sometimes simply referred to as "electrolyte membranes") are key materials of polymer electrolyte fuel cells. In recent years, use of polymer electrolyte membranes in hydrogen infrastructure-related equipment such as solid polymer electrolyte membrane water electrolyzers and electrochemical hydrogen pumps is also under consideration.

In the application of the polymer electrolyte membrane to such electrochemical devices, a member including an electrolyte membrane and a catalyst layer bonded to the electrolyte membrane is used. A typical example of such a member is a membrane-electrode assembly (MEA) including an electrolyte membrane and a catalyst layer-formed gas diffusion layer formed on a surface of the electrolyte membrane.

For example, the following method is known as a method of manufacturing an MEA. First, a catalyst solution is applied to a surface of a sheet that is made of gas-permeable carbon paper or the like, and used as a base material, and that is referred to as a gas diffusion layer. Then, the solvent in the applied catalyst solution is evaporated to form a dried catalyst layer-formed gas diffusion layer. Further, the dried catalyst layer-formed gas diffusion layer and an electrolyte membrane are thermocompression-bonded together using a flat press or a roll press to bond the catalyst layer-formed gas diffusion layer to the polymer electrolyte membrane. The method of bonding the once dried catalyst layer to the electrolyte membrane is employed because if the solvent in the catalyst solution adheres to the electrolyte membrane, the solvent may swell the electrolyte membrane to cause wrinkles, and the electrolyte membrane may be deformed.

When the dried catalyst layer-formed gas diffusion layer is thermocompression-bonded to the electrolyte membrane, however, the adhesion between the catalyst layer and the electrolyte membrane may be insufficient unless the catalyst layer-formed gas diffusion layer and the electrolyte membrane are pressed at high temperature and high pressure for a long time. Meanwhile, if the catalyst layer and the electrolyte membrane are subjected to harsh thermocompression bonding conditions in order to improve the adhesion therebetween, the catalyst layer may be compressed and deformed, resulting in reduced gas diffusivity and poor power generation performance, or the electrolyte membrane may be subjected to thermal stress and damaged, resulting in poor durability. Furthermore, the gas diffusion layer compressed and deformed may result in reduced gas diffusivity and in damage. However, if the temperature and pressure of the pressing are simply reduced in order to reduce the damage to the catalyst layer-formed gas diffusion layer and the electrolyte membrane, the pressing time needs to be increased to compensate for the reduction, so that the productivity is greatly reduced.

Therefore, various techniques have been proposed in order to achieve satisfactory adhesion between the electrolyte membrane and the catalyst layer while relaxing the thermocompression bonding conditions.

PRIOR ART DOCUMENTS

Patent Documents

For example, the following methods have been proposed: a method of semi-drying a catalyst solution, and bonding a catalyst layer to an electrolyte membrane with a slight amount of a solvent component remaining in the catalyst layer as in Patent Document 1; a method of applying a solution containing a binder resin having proton conductivity to a surface of a dried catalyst layer, and bonding the catalyst layer to an electrolyte membrane before the solution is completely dried as in Patent Document 2; and a method of bonding an electrolyte membrane and a catalyst layer to each other by compression, in which both of them are included in a laminate immersed in a liquid, as in Patent Document 3.

Patent Document 1: Japanese Patent No. 4240272
Patent Document 2: Japanese Patent Laid-open Publication No. 2013-69535
Patent Document 3: Japanese Patent Laid-open Publication No. 2009-140652

SUMMARY OF THE INVENTION

Problems to be Solved by the Invention

According to the method described in Patent Document 1, it is possible to ensure satisfactory adhesion between the electrolyte membrane and the catalyst layer under relaxed thermocompression bonding conditions without causing wrinkles in the electrolyte membrane by leaving the solvent component in the catalyst layer to such an extent that only the joint surface of the electrolyte membrane to the catalyst layer may be softened. However, it is difficult to control the drying so that the amount of the remaining solvent will be uniform on the entire surface of the catalyst layer while partially removing the solvent in the catalyst solution by heating. Therefore, due to the difference in the degree of drying in the surface of the catalyst layer, products having a high interfacial resistance between the electrolyte membrane and the catalyst layer, and products having wrinkles due to deformation of the electrolyte membrane or cracks in the surface of the catalyst layer are mixed, and the products have unstable quality. In addition, the amount of the remaining solvent has a narrow margin, and the reduction of productivity may lead to an increase in cost. Further, since the solvent composition of the catalyst solution is limited, it is difficult to flexibly change the type of catalyst layer.

According to the method described in Patent Document 2, the solution containing a binder resin having proton conductivity is applied to the joint surface of the catalyst layer to the electrolyte membrane, and the catalyst layer is bonded to the electrolyte membrane before the solution is completely dried. Thus, the solution serves as an adhesive, and the method can ensure satisfactory adhesion between the electrolyte membrane and the catalyst layer even at low temperature and low pressure. However, use of the solution containing a binder resin having proton conductivity for bonding the electrolyte membrane to the catalyst layer increases the manufacturing cost. Further, the method also has the following problems: the binder resin is a component similar to that of the electrolyte membrane, so that the binder resin substantially increases the thickness of the electrolyte membrane and increases the electric resistance; and the organic solvent in the solution remaining at the interface between the electrolyte membrane and the catalyst layer may deteriorate the power generation performance.

In addition, the method described in Patent Document 3 includes the compression bonding step, in which an electrolyte membrane-containing material to be bonded and a catalyst layer-containing material to be bonded, both immersed in a liquid, are bonded to each other by compression. This step makes it possible that the electrolyte membrane and the electrolyte in the catalyst layer absorb the liquid sufficiently, are pressed in a softened state, conform to the recessed and salient portions of the joint surfaces of the catalyst layer and the gas diffusion layer as joint mates, and thus achieve strong bonding, and that the bonding between the layers that constitute the membrane-electrode assembly is enhanced without increasing the temperature and pressure during the pressing. However, not only the interface related to the bonding but also the whole members are immersed in the liquid, thus making it difficult to prevent the swelling of the electrolyte membrane to hold the form. Furthermore, different members exhibit different deformational behaviors owing to drying after the compression bonding, thus making it difficult to obtain a uniform flat assembly, and also posing a problem in that it is difficult to enhance the productivity through continuous processing using long roll-shaped members.

An object of the present invention is to provide, in the manufacture of a member including a polymer electrolyte membrane and a catalyst layer-formed gas diffusion layer bonded to the polymer electrolyte membrane (the member is hereinafter referred to as a "membrane-electrode assembly"), a manufacturing method that achieves both the relaxation of thermocompression bonding conditions (pressing pressure, pressing temperature, and pressing time) and the improvement of adhesion between the catalyst layer-formed gas diffusion layer and the electrolyte membrane with high productivity.

Solutions to the Problems

To solve the above-mentioned problems, a method of manufacturing a membrane-electrode assembly according to the present invention has the following constituents. That is, a method of manufacturing a membrane-electrode assembly including an electrolyte membrane and a catalyst layer-formed gas diffusion layer bonded to the electrolyte membrane, the method including: a liquid application step of applying, in the atmosphere, a liquid to only a surface of the catalyst layer before bonding; and a thermocompression bonding step of bonding, to the electrolyte membrane, the catalyst layer-formed gas diffusion layer to which the liquid is applied, by thermocompression bonding.

In addition a device for manufacturing a membrane-electrode assembly according to the present invention has the following constituents. That is, a device for manufacturing a membrane-electrode assembly including an electrolyte membrane and a catalyst layer-formed gas diffusion layer bonded to the electrolyte membrane, the device including: a liquid applicator that applies a liquid to a surface of the catalyst layer before bonding; and a thermocompression bonding unit that bonds, to the electrolyte membrane, the catalyst layer-formed gas diffusion layer to which the liquid is applied, by thermocompression bonding.

In the method of manufacturing a membrane-electrode assembly according to the present invention, the liquid applied in the liquid application step is preferably a water-containing liquid.

In the method of manufacturing a membrane-electrode assembly according to the present invention, the water-containing liquid preferably contains water at a content rate of 90 mass % or more and 100 mass % or less.

In the method of manufacturing a membrane-electrode assembly according to the present invention, the liquid applied in the liquid application step is preferably pure water.

In the method of manufacturing a membrane-electrode assembly according to the present invention, the liquid is preferably applied to a surface of the catalyst layer of the catalyst layer-formed gas diffusion layer, in a droplet form, in the liquid application step.

In the method of manufacturing a membrane-electrode assembly according to the present invention, the liquid is preferably applied with a sprayer in the liquid application step.

In the liquid application step in the method of manufacturing a membrane-electrode assembly according to the present invention, the liquid is applied so that the amount of the liquid in the thermocompression bonding step is preferably 0.1 µL or more and 5 µL or less per 1 cm$^2$ of the surface of the catalyst layer.

In the method of manufacturing a membrane-electrode assembly according to the present invention, the electrolyte membrane is preferably a hydrocarbon-based electrolyte membrane.

The method of manufacturing a membrane-electrode assembly according to the present invention preferably includes bonding the catalyst layer-formed gas diffusion layer to the surface of the electrolyte membrane by any one of the above-mentioned methods.

The method of manufacturing a membrane-electrode assembly according to the present invention preferably includes the steps of: applying a catalyst solution to one surface of the electrolyte membrane and drying the solution to form a first catalyst layer; bonding a catalyst layer-formed gas diffusion layer to the other surface of the electrolyte membrane by any one of the above-mentioned methods to form a second catalyst layer.

It is preferable that the method of manufacturing a membrane-electrode assembly according to the present invention further includes a step of covering the first catalyst layer with a cover film, and that the step of forming the second catalyst layer is performed in a state where the first catalyst layer is covered with the cover film.

The method of manufacturing a membrane-electrode assembly according to the present invention preferably includes the steps of: applying a catalyst solution to one surface of the electrolyte membrane to form a first catalyst layer; covering the first catalyst layer with a gas diffusion layer before drying the first catalyst layer; drying the catalyst layer through the gas diffusion layer; bonding a catalyst layer-formed gas diffusion layer to the other surface of the electrolyte membrane by any one of the above-mentioned methods to form a second catalyst layer.

In the device for manufacturing a membrane-electrode assembly according to the present invention, the liquid applicator is preferably an applicator that applies the liquid to a surface of the catalyst layer, in a droplet form.

In the device for manufacturing a membrane-electrode assembly according to the present invention, the liquid applicator is preferably a sprayer.

Effects of the Invention

According to the present invention, it is possible to manufacture a membrane-electrode assembly while achieving both the relaxation of thermocompression bonding conditions (pressing pressure, pressing temperature, and pressing time) and the improvement of adhesion between the catalyst layer-formed gas diffusion layer and the electrolyte membrane with high productivity.

BRIEF DESCRIPTION OF THE DRAWINGS

FIG. 1 is a side view showing a schematic configuration of a device for manufacturing a membrane-electrode assembly according to a first embodiment of the present invention.

FIG. 2 is a side view showing a schematic configuration for forming a first catalyst layer in the device for manufacturing a membrane-electrode assembly according to a second embodiment of the present invention.

FIG. 3 is a side view showing a schematic configuration for forming a second catalyst layer in the device for manufacturing a membrane-electrode assembly according to the second embodiment of the present invention.

FIG. 4 is a side view showing a schematic configuration for forming a first catalyst layer in the device for manufacturing a membrane-electrode assembly according to a third embodiment of the present invention.

FIG. 5 is a side view showing a schematic configuration for forming a second catalyst layer in the device for manufacturing a membrane-electrode assembly according to the third embodiment of the present invention.

FIG. 6 is a side view showing a schematic configuration for illustrating heat shield plates in the device for manufacturing a membrane-electrode assembly according to the first embodiment of the present invention.

EMBODIMENTS OF THE INVENTION

The operations of the present invention may include the following, although the present invention is not limited to the following in any way. In the thermocompression bonding step, the electrolyte membrane and the catalyst layer-formed gas diffusion layer are compressed with a liquid applied to the joint surface of the catalyst layer-formed gas diffusion layer to the electrolyte membrane, so that the air present at the interface is removed, and substantially the liquid alone is present between the electrolyte membrane and the catalyst layer-formed gas diffusion layer. When heat is further applied in this state, the liquid evaporates and the interface is evacuated, so that the adhesion between the catalyst layer-formed gas diffusion layer and the electrolyte membrane is improved. Further, since the electrolyte membrane comes into contact with the liquid and softens, the adhesion between the catalyst layer and the electrolyte membrane is further improved. Since the electrolyte membrane is held by the compression in the thermocompression bonding while being in contact with the liquid, the occurrence of swelling is prevented. Further, the liquid evaporated at the interface passes through the pores of the catalyst layer-formed gas diffusion layer having a porous structure, and is discharged to the outside of the membrane-electrode assembly.

In this regard, the "membrane-electrode assembly", as used herein, refers to, for example, a member including an electrolyte membrane and a catalyst layer-formed gas diffusion layer, what is called a gas diffusion electrode, bonded to the electrolyte membrane, wherein the catalyst layer-formed gas diffusion layer is obtained by forming a catalyst layer on one surface of a base material (gas diffusion layer) composed of a gas-permeable carbon paper or the like. In addition, the joint interface between the electrolyte membrane and the catalyst layer is the point of focus for the membrane-electrode assembly, which is hence encompassed in the technical field of the "membrane-catalyst assembly".

In addition, "manufacturing a membrane-electrode assembly" encompasses the following: an operation in which forming a catalyst layer on one surface of an electrolyte membrane is followed by further bonding a catalyst layer-formed gas diffusion layer to the other surface of the electrolyte membrane; and an operation in which bonding a catalyst layer-formed gas diffusion layer to one surface of an electrolyte membrane is followed by further forming a catalyst layer to the other surface of the electrolyte membrane. Examples of methods that can be adopted to form a catalyst layer on one or the other surface of the electrolyte membrane include a method of applying a catalyst layer directly, and a method of transferring a catalyst layer using a catalyst layer transfer sheet.

[Electrolyte Membrane]

The electrolyte membrane used in the method of manufacturing a membrane-electrode assembly and the device for manufacturing a membrane-electrode assembly of the present invention has proton conductivity. The electrolyte membrane is not particularly limited as long as it operates as an electrolyte membrane used in polymer electrolyte fuel cells, solid polymer electrolyte membrane water electrolyzers, electrochemical hydrogen pumps and the like, and may be a known or commercially available product. Such an electrolyte membrane is preferably a polymer electrolyte membrane, and an electrolyte membrane that can be used is, for example, a fluorine-based electrolyte membrane made of perfluorosulfonic acid or a hydrocarbon-based electrolyte membrane made of a hydrocarbon-based polymer obtained by imparting proton conductivity to a hydrocarbon-based skeleton.

In particular, a hydrocarbon-based electrolyte membrane has a higher glass transition temperature and larger shrinkage deformation during heating than those of a fluorine-based electrolyte membrane, and it is often difficult to find transfer conditions with excellent productivity in common thermocompression bonding methods. Therefore, the manufacturing method and the manufacturing device of the present invention can be preferably applied to a hydrocarbon-based electrolyte membrane.

In addition, an electrolyte membrane that can be used is a composite electrolyte membrane obtained by forming a polymer electrolyte and a porous base material into a composite.

[Composite Electrolyte Membrane]

The composite electrolyte membrane is a composite of a polymer electrolyte and a porous base material, and is obtained, for example, by filling (impregnating) a porous base material with a polymer electrolyte. Examples of porous base materials include hydrocarbon-based porous base materials containing a hydrocarbon-based polymer compound as a main component, fluorine-based porous base materials containing a fluorine-based polymer compound as a main component, and the like.

Examples of hydrocarbon-based polymer compounds include polyethylene (PE), polypropylene (PP), polystyrene (PS), polyacrylate, polymethacrylate, polyvinyl chloride (PVC), polyvinylidene chloride (PVdC), polyesters, polycarbonate (PC), polysulfone (PSU), polyethersulfone (PES), polyphenylene oxide (PPO), polyarylene ether-based polymers, polyphenylene sulfide (PPS), polyphenylene sulfide sulfone, polyparaphenylene (PPP), polyarylene-based polymers, polyarylene ketone, polyetherketone (PEK), polyarylene phosphine oxide, polyether phosphine oxide, polybenzoxazole (PBO), polybenzothiazole (PBT), polybenzimidazole (PBI), polyamide (PA), polyimide (PI), polyether imide (PEI), polyimide sulfone (PIS), and the like.

Examples of fluorine-based polymer compounds include polytetrafluoroethylene (PTFE), polyhexafluoropropylene, tetrafluoroethylene-hexafluoropropylene copolymers (FEP), ethylene-tetrafluoroethylene copolymers (ETFE), polyvinylidene fluoride (PVdF), polychlorotrifluoroethylene (PCTFE), perfluoroalkoxy fluororesins (PFA), ethylene-chlorotrifluoroethylene copolymers (ECTFE), and the like.

From viewpoints of water resistance, chemical resistance, and mechanical characteristics, PE, PP, PPS, PEK, PBI, PTFE, polyhexafluoropropylene, FEP, and PFA are preferable. Furthermore, from viewpoints of chemical resistance and chemical durability, PTFE, polyhexafluoropropylene, FEP, are PFA are more preferable. From a viewpoint of having high mechanical strength by virtue of the molecular orientation, PTFE is particularly preferable.

The composite electrolyte membrane is particularly preferably a composite of a hydrocarbon-based electrolyte and a fluorine-based porous base material. In this case, the composite formation in which a nonionic fluorosurfactant is added to a hydrocarbon-based electrolyte solution makes it easier that a fluorine-based porous base material is filled (impregnated) tightly with a hydrocarbon-based electrolyte with high efficiency.

A composite electrolyte membrane can be produced, for example, by impregnating a porous base material with a polymer electrolyte solution, and then, drying the solution to remove the solvent from the polymer electrolyte solution. Examples of the impregnating method include the below-mentioned methods.

(1) A method in which a porous base material immersed in a polymer electrolyte solution is pulled up, during which the excess solution is removed so that the film thickness can be controlled.
(2) A method in which a polymer electrolyte solution is applied to a porous base material by cast coating.
(3) A method in which a polymer electrolyte solution is applied to a support base material by cast coating, and a porous base material is attached onto the solution so as to be impregnated with the solution.

[Catalyst Layer]

The catalyst layer used in the method of manufacturing a membrane-electrode assembly and the device for manufacturing a membrane-electrode assembly of the present invention is not particularly limited as long as it operates as a catalyst layer used in polymer electrolyte fuel cells, solid polymer electrolyte membrane water electrolyzers, electrochemical hydrogen pumps and the like. In general, it is possible to use a catalyst layer having a porous structure and including conductive particles such as carbon particles, catalyst particles supported on the conductive particles, such as platinum particles or platinum alloy particles, and an electrolyte component having proton conductivity, such as an ionomer.

Examples of preferable conductive particles include particles of carbon materials such as oil furnace black, gas furnace black, acetylene black, thermal black, graphite, carbon nanotubes, and graphene, and metal oxides such as tin oxide and titanium oxide. Examples of preferable catalyst particles include particles of single noble metals such as platinum, iridium, ruthenium, rhodium, and palladium, alloys of manganese, iron, cobalt, nickel, copper, zinc, or the like with platinum, ternary alloys of these metals with platinum and ruthenium, and iridium oxide. Examples of a preferable electrolyte component include perfluorocarbon sulfonic acid-based polymers such as "Nafion" (registered trademark, manufactured by The Chemours Company), "Aquivion" (registered trademark, manufactured by Solvay Specialty Polymers), "FLEMION" (registered trademark, manufactured by Asahi Glass Co., Ltd.), "Aciplex" (registered trademark, manufactured by Asahi Kasei Corporation), and "Fumion" F (registered trademark, manufactured by FuMA-Tech GmbH), and hydrocarbon-based polymers such as polysulfone sulfonic acid, polyaryletherketone sulfonic acid, polybenzimidazole alkylsulfonic acid, polybenzimidazole alkylphosphonic acid, polystyrene sulfonic acid, polyetheretherketone sulfonic acid, and polyphenyl sulfonic acid.

The catalyst solution is not particularly limited as long as it is a solution containing these catalyst layer materials dispersed in a solvent that evaporates by drying, and is capable of forming the catalyst layer on the electrolyte membrane. In general, the solvent used is preferably water, an alcohol such as methanol, ethanol, 1-propanol, 2-propanol, tert-butanol, or ethylene glycol, or N,N-dimethylformamide or N-methyl-2-pyrrolidone.

[Gas Diffusion Layer]

The gas diffusion layer used in the method of manufacturing a membrane-electrode assembly and the device for manufacturing a membrane-electrode assembly of the present invention is not particularly limited as long as it operates as a gas diffusion layer used in polymer electrolyte fuel cells, solid polymer electrolyte membrane water electrolyzers, electrochemical hydrogen pumps and the like. A gas diffusion layer that can be commonly used has low electric resistance, can serve for current-collecting or electric supply, and can form a catalyst layer. Examples of constituent materials for such a gas diffusion layer include carbonaceous materials and conductive inorganic substances. Examples of such materials include calcined products from polyacrylonitrile, calcined products from pitch, carbon materials such as graphite and expanded graphite, stainless steel, molybdenum, titanium, and the like. These are not limited to any particular form, are used, for example, in fibrous or particulate form, and are preferably fibrous conductive substances (conductive fibers) such as carbon fibers from a viewpoint of fuel permeability. Such a gas diffusion layer for which a conductive fiber is used may have either a woven fabric structure or a nonwoven fabric structure. Examples of such woven fabrics to be used include, but are not limited particularly to, plain weaves, twill weaves, satin weaves, figured fabrics, handwoven brocades, and the like. In addition, examples of nonwoven fabrics to be used include, but are not limited particularly to, nonwoven fabrics produced by a papermaking method, needlepunching method, spunbonding method, water-jet-punching method, meltblowing method, and the like. Alternatively, knitted fabrics may be used. In cases where carbon fibers in particular are used for these fabrics, examples of fabrics to be preferably used include: woven fabrics obtained by carbonizing or graphitizing plain weave fabrics made with flame-resistant spun yarn; nonwoven fabrics obtained by processing flame-resistant yarn into nonwoven fabrics by a needlepunching method, a water-jet-punching method, or the like, followed by carbonizing or graphitizing the nonwoven fabrics; mat nonwoven fabrics produced with flame-resistant yarn, carbonized yarn, or graphitized yarn by a papermaking method; and the like. In particular, it is preferable to use nonwoven fabrics or cloth from a viewpoint of making it possible to obtain thin fabrics having strength. Examples of carbon fibers to be used for such gas diffusion layers include polyacrylonitrile (PAN) carbon fibers, phenolic carbon fibers, pitch carbon fibers, rayon-based carbon fibers, and the like. Examples of carbon fibers to be used include: carbon paper, TGP series and SO series, manufactured by TORAY INDUSTRIES, INC.; carbon cloth manufactured by E-TEK; and the like.

In addition, such a gas diffusion layer can be subjected to water-repellent treatment for preventing gas diffusion/permeability from being decreased by residence of water, partial water-repellent or hydrophilizing treatment for forming an exhaust passage of water, the addition of carbon powder for decreasing the resistance, platinum plating for affording electric potential corrosion resistance, and the like. In addition, a conductive interlayer containing at least an inorganic conductive substance and a hydrophobic polymer can be provided between the electrode base material and the catalyst layer. In particular, in cases where the electrode base material is a carbon fiber textile or a nonwoven fabric having large porosity, providing such a conductive interlayer makes it possible to inhibit the performance from being decreased by the infiltration of the catalyst solution into the gas diffusion layer.

[Catalyst Layer-Formed Gas Diffusion Layer]

A catalyst layer-formed gas diffusion layer to be used for a method and a device for manufacturing a membrane-electrode assembly according to the present invention is subject to no limitation as long as such a catalyst layer-formed gas diffusion layer includes the above-mentioned catalyst layer and the above-mentioned gas diffusion layer formed on the catalyst layer. A catalyst layer-formed gas diffusion layer that can be commonly used is obtained by directly applying the catalyst solution to the gas diffusion layer, and drying the catalyst solution. Another catalyst layer-formed gas diffusion layer that can be used is formed as follows: the catalyst solution is once applied to a temporary base material other than the gas diffusion layer, dried, and molded in sheet form: the resulting sheet is thermocompression-bonded to the gas diffusion layer; and the temporary base material is removed.

[Liquid Application Step]

The liquid application step is a step of applying a liquid to a surface of the catalyst layer of the catalyst layer-formed gas diffusion layer before bonding, that is, a joint surface of the catalyst layer to the electrolyte membrane. The term "application of a liquid" means to produce a state in which the liquid is attached to the surface of the catalyst layer of the catalyst layer-formed gas diffusion layer in an exposed state. It is preferable to prevent the liquid from substantially permeating into the catalyst layer. If the liquid does not permeate into the catalyst layer, the electrolyte component in the catalyst layer will not undesirably be dissolved, and not reduce the strength of the catalyst layer, so that cracks can be effectively prevented from occurring in the thermocompression bonding step.

In the liquid application step, the liquid is applied to only a surface of the catalyst layer in the atmosphere. Compared with applying the liquid to both of the catalyst layer and the electrolyte membrane, applying the liquid to only a surface of the catalyst layer has an advantage in that fewer parameters of process control are involved, thus making it easier to stabilize the production conditions, and to control and manage the amount of the liquid to be applied to the joint surface, and an advantage in that the amount of the liquid on the joint surface can be prevented from becoming uneven owing to the contact between the liquid droplets before the thermocompression bonding step.

In addition, applying the liquid in the atmosphere makes it possible to apply the liquid to only a surface of the catalyst layer, and to prevent the liquid from permeating into the catalyst layer. Inhibiting the liquid from permeating into the catalyst layer makes it possible to effectively inhibit a decrease in the strength of the catalyst layer and effectively inhibit the occurrence of cracks. The liquid that has permeated into the catalyst layer does not contribute to enhancing the adhesion at the interface, but rather increases the amount of energy consumption for evaporation, and accordingly, preventing the liquid from permeating into the catalyst layer is effective also from a viewpoint of production cost.

In the liquid application step, the liquid is not particularly limited as long as it is a material that evaporates by heating in the subsequent thermocompression bonding step and has no toxicity to the electrolyte membrane and the catalyst layer-formed gas diffusion layer. For example, water, alcohols such as methanol, ethanol, 1-propanol, 2-propanol, and tert-butanol, and mixtures thereof can be used, but it is desirable to use a liquid containing at least water. If the liquid undergoes a sudden temperature change during thermocompression bonding, wrinkles may occur in the electrolyte membrane. However, a water-containing liquid can prevent such damages because water has a higher boiling point and a higher specific heat than those of the above-mentioned alcohols, and undergoes a gradual temperature rise during thermocompression bonding. Further, since water has a lower capability of permeating into the catalyst layer than alcohols do, it is possible to prevent the occurrence of cracks due to the permeation of the liquid into the catalyst layer. Moreover, use of the water-containing liquid enables to carry out the present invention at low cost, and can also reduce the environmental load of the manufacture. Even if the liquid remains in the membrane-electrode assembly manufactured with the manufacturing device by the manufacturing method according to the present invention, the liquid does not have any effect on the performance of the equipment in which the liquid is used as long as the liquid is water. In the water-containing liquid, the content rate of water is more preferably 50 mass % to 100 mass %, still more preferably 90 mass % to 100 mass %, and even more preferably 100 mass %. In other words, it is most preferable to use pure water as the liquid. Herein, "pure water" is high-purity water that does not contain impurities, and refers to water at a level of grade A4 of JIS K 0557 (1998) that is collected through a reverse osmosis membrane and an ion exchange resin and obtained using a commercially available pure water production machine, or water of the equivalent quality.

The liquid may contain a solid material in a dissolved or dispersed state as long as the liquid has fluidity as a whole and provides the effects of the present invention.

In the liquid application step, the liquid application method is not particularly limited, and examples of the method include: a method of forming a uniform coating film on the surface of the catalyst layer using a gravure coater, a die coater, a comma coater, or the like; and a method of applying the liquid to the surface of the catalyst layer, in a droplet form. The method of applying the liquid to the surface of the catalyst layer, in a droplet form, is particularly preferable. Herein, the term "droplet form" refers to a state in which innumerable droplets are attached to the surface of the catalyst layer. The term "droplets" refers to, among masses of the liquid aggregated by surface tension, masses having a size of 1 cm$^2$ or less on the catalyst layer. In the case where the liquid is applied in the droplet form, it is possible to uniformly apply the minimum necessary amount of the liquid for softening the electrolyte membrane to the joint surface during bonding. Note that the applied droplets are "uniform" means that the total amount of the liquid applied per 1 cm$^2$ of the joint surface is the same at any position in the joint surface. Further, even a liquid that tends to repel the catalyst layer and hardly forms a uniform coating film, such as water, can be easily applied in a droplet form. Further, in the case where the liquid is in a droplet form, the area of contact between the liquid and the catalyst layer is small, so that it is possible to minimize the permeation of the liquid into the catalyst layer before the thermocompression bonding. Since the droplets are spread on the interface and unite with the neighboring droplets due to the compression in the thermocompression bonding step, it is possible to soften the electrolyte membrane at the whole interface.

In the liquid application step, it is preferable to apply the liquid so that the amount of liquid at the start of compression bonding in the thermocompression bonding step may be 0.1 μL or more and 5 μL or less per 1 cm$^2$ of the surface of the catalyst layer. If the amount of liquid in the thermocompression bonding step is within the preferable range, the electrolyte membrane can be sufficiently softened, the adhesion is sufficient, and there is no undesirable possibility that part of droplets do not unite with each other during the compression in the thermocompression bonding step, thus inhibiting some parts of the electrolyte membrane from being softened. On the other hand, the liquid will not drip during transportation, substantially all the amount of the liquid evaporates through the heating during the thermocompression bonding, and accordingly there is no undesirable possibility that the electrolyte membrane may swell owing to the liquid remaining at the interface at the moment the compression is released. The amount of liquid is more preferably 0.1 μL or more and 0.8 μL or less per 1 cm$^2$ of the surface of the catalyst layer. The amount of liquid can be measured by attaching, to the surface of the catalyst layer of the catalyst layer-formed gas diffusion layer, a sample piece such as a PET film piece whose weight has been measured so as to stack the sample piece on the catalyst layer, applying the liquid to the catalyst layer in the liquid application step, removing the sample piece with the liquid immediately before the sample piece comes into contact with the electrolyte membrane in the thermocompression bonding step and measuring the weight of the sample piece with the liquid, and calculating the volume of the liquid per 1 cm$^2$ from the weight difference. The sample piece in the measurement may be a square piece with a side of 1 cm to 10 cm.

Further, the smaller the average diameter of the applied droplets is, the more preferable it is. More specifically, the average diameter of the droplets is preferably 300 μm or less in a state where the droplets are attached to a surface of the catalyst layer. The smaller the average diameter of the droplets is, the shorter the distance between the droplets is, so that the droplets can unite with each other with a smaller amount of liquid during compression in the thermocompression bonding step.

In the liquid application step, the means for applying the liquid in a droplet form is not particularly limited, and examples of the usable means include a method of spraying the droplets with a sprayer or inkjet, a method of condensing the droplets on the joint surface in a humidified atmosphere, and a method of spraying the liquid in a mist form using an ultrasonic transducer or the like. The method of spraying the droplets with a sprayer is preferable from the viewpoint that the liquid can be efficiently applied with the amount of liquid being controlled. The sprayer for spraying the droplets is not particularly limited, and a two-fluid spray nozzle or the like that is used to atomize and spray the liquid by compressed air can be used.

In cases where such a means for applying the liquid in a droplet form as above-mentioned is used, it is preferable that a liquid applicator such as a spray nozzle is enclosed in a chamber in order that the droplets can be prevented from scattering around. In addition, the pressure in the chamber does not have to be reduced, but reducing the pressure to a small degree to make the pressure negative with respect to the atmospheric pressure prevents droplets from scattering around through the gap between the chamber and the catalyst layer, and hence is preferable.

[Thermocompression Bonding Step]

The catalyst layer that has been subjected to the liquid application step is then subjected to a thermocompression bonding step in which the catalyst layer-formed gas diffusion layer is thermocompression-bonded to the electrolyte membrane. The thermocompression bonding step is a step of bonding the catalyst layer-formed gas diffusion layer to the electrolyte membrane by heating and compressing the catalyst layer-formed gas diffusion layer and the electrolyte membrane in a stacked state in which the liquid-coated surface of the catalyst layer-formed gas diffusion layer is in contact with the electrolyte membrane.

In the thermocompression bonding step, the time from when the catalyst layer-formed gas diffusion layer comes into contact with the electrolyte membrane until the compression force acts on the catalyst layer and the electrolyte membrane is preferably 0.1 seconds or less. If the time is within this preferable range, the electrolyte membrane is less likely to swell due to adhesion of the liquid, and makes it possible to prevent swelling because the adhesion of the liquid and the fixation of the electrolyte membrane by thermocompression bonding proceed substantially at the same time.

The heating temperature in the thermocompression bonding step is not particularly limited, but is preferably equal to or higher than the boiling point of the liquid applied to the catalyst layer-formed gas diffusion layer (hereinafter referred to as the "boiling point of the liquid") and 220° C. or less. The heating temperature is the maximum temperature at the joint surface between the electrolyte membrane and the catalyst layer during the thermocompression bonding step, and can be measured using a thermocouple. In cases where the heating temperature is within the preferable range, the liquid does not take time for evaporation, thus contributing to having excellent productivity. On the other hand, the electrolyte membrane will have no undesirable possibility of being damaged by heat. The heating temperature in the thermocompression bonding step is more preferably equal to or higher than the boiling point of the liquid and 160° C. or less. The term "boiling point of the liquid" refers to the boiling point at an external pressure of 1 atm. When the liquid to be evaporated has a single composition, the term means the boiling point of the liquid. When the liquid to be evaporated is a mixture, the term means the highest boiling point among those of the single components in the mixture.

The pressure applied to the electrolyte membrane and the catalyst layer in the thermocompression bonding step may be appropriately set, but is preferably 1 MPa or more and 20 MPa or less. If the pressure is within the preferable range, the electrolyte membrane and the catalyst layer-formed gas diffusion layer can be adhered to each other sufficiently, and on the other hand, no excessive pressure is applied to the catalyst layer-formed gas diffusion layer or the electrolyte membrane, so that the structure of the catalyst layer-formed gas diffusion layer is not destroyed, and mechanical damage to the electrolyte membrane does not increase, resulting in posing no undesirable possibility of deteriorating the durability and power generation performance. The pressure in the thermocompression bonding step is more preferably 1 MPa to 10 MPa.

The form of compression in the thermocompression bonding step is not particularly limited, and may be a mode of a line contact in which the electrolyte membrane and the catalyst layer-formed gas diffusion layer come into contact with each other in a single line form as with a hot press roll, or a mode of a surface contact in which the electrolyte membrane and the catalyst layer-formed gas diffusion layer come into contact with each other in a plane form over a certain width in the transport direction as with a double-belt pressing mechanism.

[Manufacturing Method by Roll-to-Roll Method]

A method of manufacturing a membrane-electrode assembly according to the present invention is preferably performed by a roll-to-roll method. That is, the liquid application step and the thermocompression bonding step are continuously performed by a roll-to-roll method.

A manufacturing method based on a roll-to-roll method is, for example, a manufacturing method in which a long roll-shaped electrolyte membrane and a long roll-shaped catalyst layer-formed gas diffusion layer are each continuously unwound and conveyed, and undergo the liquid application step and the thermocompression bonding step to produce a membrane-electrode assembly, which is wound up in roll shape.

The below-mentioned device for manufacturing a membrane-electrode assembly is one example of a manufacturing device that can perform a manufacturing method based on a roll-to-roll method.

The manufacturing method of the present invention has been described above, and as can be easily understood from the above description and the following description of embodiments, the present specification also discloses a manufacturing device as described below for carrying out the manufacturing method.

(1) A device for manufacturing a membrane-electrode assembly including an electrolyte membrane and a catalyst layer-formed gas diffusion layer bonded to the electrolyte membrane, the device including a liquid applicator that applies a liquid to a surface of the catalyst layer before bonding, and a thermocompression bonding unit that bonds, to the electrolyte membrane, the catalyst layer-formed gas diffusion layer to which the liquid is applied, by thermocompression bonding.

(2) The device for manufacturing a membrane-electrode assembly according to (1), wherein said liquid applicator is an applicator that applies said liquid to said surface of said catalyst layer, in a droplet form.

(3) The device for manufacturing a membrane-electrode assembly according to (2), wherein the liquid applicator is a sprayer.

Hereinafter, specific embodiments of the present invention will be described with reference to schematic diagrams of the manufacturing device for achieving the manufacturing method of the present invention. It is to be noted that the following description is provided for facilitating the understanding of the present invention, and does not limit the present invention in any way. However, as can be easily understood by those skilled in the art, references to preferable aspects and variations of aspects in individual embodiments are to be interpreted as descriptions of the manufacturing method or the manufacturing device of the present invention as a superordinate concept. In the present specification, the upper part of each drawing is referred to as "upper" and the lower part thereof is referred to as "lower" for convenience, but the vertical direction of each drawing is not necessarily limited to the vertical direction from the ground.

First Embodiment

Manufacture of Membrane-Electrode Assembly—1

FIG. 1 is a side view showing a schematic configuration of a device for manufacturing a membrane-electrode assembly according to the present invention.

In a device 100 for manufacturing a membrane-electrode assembly according to the embodiment, a membrane-electrode assembly is manufactured as follows.

An electrolyte membrane 10 is unwound from an electrolyte membrane supply roll 11, and supplied to a thermocompression bonding section P through a guide roll 12. The catalyst layer-formed gas diffusion layer supply rolls 21A and 21B are provided above and below an electrolyte membrane 10 unwound, respectively. A catalyst layer-formed gas diffusion layer to be bonded to the upper surface of the electrolyte membrane 10 is formed using a catalyst layer-formed gas diffusion layer 20A. The catalyst layer-formed gas diffusion layer 20A is produced, for example, by preliminarily applying a catalyst solution to a gas diffusion layer. The catalyst layer-formed gas diffusion layer 20A is unwound from the catalyst layer-formed gas diffusion layer supply roll 21A, and is transported through a backup roll 31A and a guide roll 22A in this order with the gas diffusion layer side reverse to the catalyst layer-formed surface of the catalyst layer-formed gas diffusion layer 20A being supported on the rolls. A catalyst layer-formed gas diffusion layer 20B for forming a catalyst layer-formed gas diffusion layer on the lower surface of the electrolyte membrane 10 is unwound from the catalyst layer-formed gas diffusion layer supply roll 21B, and is transported through a backup roll 31B and a guide roll 22B in this order with the gas diffusion layer side of the catalyst layer-formed gas diffusion layer 20B being supported on the rolls. In this way, the catalyst layer-formed gas diffusion layers 20A and 20B are supplied to a thermocompression bonding section P so that the surfaces of the catalyst layer-formed gas diffusion layers on which the catalyst layers are formed may face the electrolyte membrane 10.

In this regard, the gas diffusion layer has air permeability. Having air permeability means to have a property of being capable of permeating gases, and examples of a case where the gas diffusion layer has air permeability include a case where the gas diffusion layer has pores communicating in the thickness direction thereof. Having air permeability makes it possible to effectively discharge the liquid vapor generated during thermocompression bonding.

For the guide rolls 12, 22A, and 22B, it is preferable to use an expander roll in order to eliminate wrinkles and slacks of the electrolyte membrane 10 and the catalyst layer-formed gas diffusion layers 20A and 21B supplied to the thermocompression bonding section P.

The device 100 for manufacturing a membrane-electrode assembly according to this embodiment is configured to bond the catalyst layer-formed gas diffusion layer to each of both surfaces of the electrolyte membrane 10, but may be configured to bond the catalyst layer-formed gas diffusion layer to only one surface of the electrolyte membrane 10.

Bonding a catalyst layer-formed gas diffusion layer to only one surface of an electrolyte membrane makes it possible to add a function, for example, by sandwiching a film cut in frame shape before further bonding a catalyst layer-formed gas diffusion layer to the other surface of the electrolyte membrane. Alternatively, an MEA in sheet shape can be made as follows: an electrolyte membrane having a catalyst layer-formed gas diffusion layer bonded to only one surface thereof is cut to desired dimensions, and is further bonded to a frame-shaped film material or a catalyst layer-formed gas diffusion layer.

In this embodiment, a spray nozzle 30A is provided so as to face the catalyst layer-formed gas diffusion layer 20A supported on the backup roll 31A. The spray nozzle 30A has a discharge port directed toward the central axis of the backup roll 31A, and is provided at a position separated from the backup roll 31A by a predetermined distance. At least one spray nozzle 30A is provided in the width direction of the catalyst layer-formed gas diffusion layer 20A in accordance with the width of the base material of the catalyst layer-formed gas diffusion layer 20A.

The spray nozzle 30A discharges water supplied from a water supply tank (not shown) from the discharge port to apply droplets to the joint surface of the catalyst layer-formed gas diffusion layer to the electrolyte membrane.

Further, the spray nozzle 30A and a space S in which the droplets from the discharge port of the spray nozzle 30A fly to the catalyst layer-formed gas diffusion layer are surrounded by a nozzle chamber 32A. To the nozzle chamber 32A, a pressure reducing tank 34A for reducing the pressure in the space S is connected by piping via a valve 33A for switching to pressure reduction. Since the pressure reducing tank 34A makes the space S have a negative pressure relative to the environmental pressure of the manufacturing device, the outside air is slightly sucked into the space S from the gap provided between the nozzle chamber 32A and the catalyst layer-formed gas diffusion layer 20A, and excess droplets from the spray nozzle 30A are prevented from scattering around. The water collected in the nozzle chamber 32A is discharged from a drain (not shown) provided in the nozzle chamber 32A, and returned to the water supply tank and reused.

The above-mentioned description is a description of the liquid applicator for the catalyst layer-formed gas diffusion layer 20A, and the description of the liquid applicator (a spray nozzle 30B, a nozzle chamber 32B, a valve 33B, and a pressure reducing tank 34B) provided for the catalyst layer-formed gas diffusion layer 20B is omitted because the latter liquid applicator has a similar configuration to that of the former liquid applicator.

The pressure in the nozzle chambers 32A and 32B does not have to be reduced, but reducing the pressure to a small degree makes it possible to prevent the droplets from scattering around, and hence is preferable. In this case, an excessively large degree of pressure reduction increases the amount of outside air sucked into the nozzle chambers 32A and 32B, and accordingly, the air flows in the nozzle chambers 32A and 32B are disturbed, and will undesirably decrease the application accuracy of the droplets. Accordingly, the degree of pressure reduction in the nozzle chambers 32A and 32B is suitably, for example, in the range down to −50.0 kPa with respect to the environmental pressure (atmospheric pressure) in the manufacturing device, preferably in the range down to −10.0 kPa, more preferably in the range down to −5.0 kPa.

In this way, the electrolyte membrane 10, and the catalyst layer-formed gas diffusion layers 20A and 20B with the liquid applied to the joint surfaces to the electrolyte membrane 10 are supplied to the thermocompression bonding section P, and pass between hot press rolls 40A and 40B. As shown in FIG. 6, it is preferable to provide heat shield plates 41A and 41B between the catalyst layer-formed gas diffusion layer 20A and the hot press roll 40A and between the catalyst layer-formed gas diffusion layer 20B and the hot press roll 40B, respectively. Providing the heat shield plates 41A and 41B prevents the liquid applied to the catalyst layer-formed gas diffusion layers 20A and 20B from evaporating before the heat pressing due to the radiant heat radiated from the hot press rolls 40A and 40B.

The hot press rolls 40A and 40B are connected to a driving unit (not shown), and can rotate at a controlled speed. The hot press rolls 40A and 40B rotate at a constant speed while applying heat and pressure to the electrolyte membrane 10 and the catalyst layer-formed gas diffusion layers 20A and 20B. Accordingly, the hot press rolls 40A and 40B, while transporting the electrolyte membrane 10 and the catalyst layer-formed gas diffusion layers 20A and 20B at a synchronized transport speed, thermocompression-bond the catalyst layer-formed gas diffusion layer to each of both surfaces of the electrolyte membrane 10 to form a membrane-electrode assembly 13a. For the hot roll presses 40A and 40B, the heating device, pressurizing device, and the like are not shown.

The materials of the hot press rolls 40A and 40B are not particularly limited, but it is preferable that one of the rolls be made of a metal such as stainless steel, and the other roll have a structure in which the roll is covered with a surface layer made of an elastic body such as a resin or an elastomer material typified by a rubber. It is possible to sufficiently heat the electrolyte membrane and the catalyst layer-formed gas diffusion layers with one of the hot press rolls 40A and 40B made of a metal, and to maintain a satisfactory line contact between the electrolyte membrane and the catalyst layer-formed gas diffusion layers and uniformize the line pressure in the width direction of the base material with the other press roll having a surface layer made of an elastic body, because the press roll flexibly changes the shape following the catalyst layer-formed gas diffusion layers 20A and 20B.

As for the material of the elastic body, when a rubber is used, examples of usable materials include a fluororubber, a silicon rubber, an EPDM (ethylene-propylene-diene rubber), neoprene, a CSM (chlorosulfonated polyethylene rubber), a urethane rubber, a NBR (nitrile rubber), and ebonite. It is preferable that the elastic body have a rubber hardness in the range of 70 to 97° according to the Shore A standard. If the elastic body has a rubber hardness in the preferable range, the amount of deformation of the elastic body is suitable, and the contact width for compression with the catalyst layer-formed gas diffusion layers 20A and 20B is not too large, so that the pressure required for bonding the electrolyte membrane 10 to the catalyst layer can be secured. On the other hand, the contact width for compression is not too small, so that the compression time required for bonding can be secured.

The means for heating the hot press rolls 40A and 40B is not particularly limited, and various heaters, and heat media such as steam and oil can be used. Further, the heating temperature may be the same or different for the upper and lower rolls.

The method of controlling the compression force of the hot press rolls 40A and 40B is not particularly limited, and the compression force may be controlled using a pressurizing unit such as a hydraulic cylinder, or may be controlled in accordance with the size of a gap provided between the hot press rolls 40A and 40B, which is adjusted to a certain size through position control using a servomotor or the like.

In this embodiment, the hot press rolls 40A and 40B as a line contact mechanism are used in the thermocompression bonding section P, but the present invention is not limited thereto. The mechanism may be a mechanism for compressing the electrolyte membrane 10 and the catalyst layer-formed gas diffusion layers 20A and 20B by a plurality of line contacts using a plurality of rolls, or a double-belt pressing mechanism for compressing the electrolyte membrane 10 and the catalyst layer-formed gas diffusion layers 20A and 20B by a surface contact. When a plurality of pairs of rolls are used, the number of rolls provided is not particularly limited, but is preferably 2 to 10 pairs.

In this way, the electrolyte membrane 10 and the catalyst layer-formed gas diffusion layers 20A and 20B pass through the thermocompression bonding section P, and the catalyst layer-formed gas diffusion layer is bonded to each of both surfaces of the electrolyte membrane 10, whereby the membrane-electrode assembly 13a is formed.

The feeding roll 14 can be connected to a driving unit (not shown), and it is possible to transport the electrolyte membrane 10 at a controlled speed when the press rolls 40A and 40B do not compress the electrolyte membrane 10 and the catalyst layer-formed gas diffusion layers 20A and 20B.

In addition, it is possible to install a heating unit (not shown) for heating, in the thermocompression bonding section P, the membrane-electrode assembly 13a including an electrolyte membrane and a catalyst layer bonded to each of both surfaces of the electrolyte membrane. The heating unit can be installed, for example, between the thermocompression bonding section P and the feeding roll 14. Examples of heating units that can be used include hot air and heating rolls. The hot air temperature or the surface temperature of the heating roll is, for example, suitably 120° C. to 250° C., preferably 150° C. to 230° C.

Second Embodiment

Manufacture of Membrane-Electrode Assembly—2

In the second embodiment, first, a first catalyst layer is formed on one surface of an electrolyte membrane using a catalyst layer forming apparatus 101 shown in FIG. 2. The first catalyst layer is formed as follows.

In this embodiment, an electrolyte membrane 10' in a state of being supported on a support is supplied to the catalyst layer forming apparatus 101. The material of the support for the electrolyte membrane is not particularly limited, but a PET film can be used, for example.

The electrolyte membrane 10' with the support is unwound from an electrolyte membrane supply roll 11, and supplied to a catalyst solution coater 72 through a guide roll 12. The catalyst solution coater 72 is provided so as to face the electrolyte membrane 10' supported on a backup roll 73. To the catalyst solution coater 72, a catalyst solution is supplied from a catalyst solution tank 70 using a catalyst solution feeding pump 71, and the catalyst solution coater 72 forms a coating film by applying the supplied catalyst solution to the electrolyte membrane. The method for applying the catalyst solution in the catalyst solution coater 72 is not particularly limited. Methods such as a gravure coater, a die coater, a comma coater, a roll coater, a spray coater, and a screen printing method can be employed.

In this regard, in the present embodiment, the catalyst layer is formed by applying a catalyst solution to the electrolyte membrane 10', but the catalyst layer may be formed by transfer onto the electrolyte membrane 10' using a catalyst layer transfer sheet.

Then, the coating film of the catalyst solution formed on the electrolyte membrane is dried by a dryer 74, and the solvent in the catalyst solution is evaporated to form a dried first catalyst layer. The method for drying the catalyst solution in the dryer 74 is not particularly limited. A method of blowing a heat medium such as hot air, or a heat oven method using a heater can be employed.

A membrane-first catalyst layer assembly 16 including the electrolyte membrane and the first catalyst layer formed on the electrolyte membrane is fed by a feeding roll 14 and wound into a roll by a take-up roll 17 with the support attached to the membrane-first catalyst layer assembly 16.

Then, a second catalyst layer is formed on a surface of the electrolyte membrane reverse to the surface on which the first catalyst layer is formed using a device 102 for manufacturing a membrane-electrode assembly according to an embodiment shown in FIG. 3. The second catalyst layer is formed as follows.

The membrane-first catalyst layer assembly 16 is unwound from a supply roll 18 and passes on a guide roll 12, and a support 51 is separated from the interface with the electrolyte membrane via guide rolls 26A and 26B. The support 51 separated in this process is wound on a support take-up roll 50.

On a first catalyst layer surface of the membrane-first catalyst layer assembly 16 from which the support 51 has been separated, a cover film 61 unwound from a cover film supply roll 60 is laminated via guide rolls 27A and 27B, and then the membrane-first catalyst layer assembly 16 with the cover film 61 is supplied to a thermocompression bonding section P. The cover film 61 may be laminated before the support 51 is separated.

The cover film 61 is used to protect the first catalyst layer during the step of forming the second catalyst layer, and the material of the cover film 61 is not particularly limited as long as it does not interfere with the function of the catalyst layer by the attachment and detachment. In general, it is possible to use natural fiber sheets typified by paper, hydrocarbon-based plastic films typified by those of polyethylene terephthalate (PET), polyethylene naphthalate (PEN), polyethylene (PE), polypropylene (PP), polyimide, and polyphenylene sulfide, fluorine-based films typified by those of perfluoroalkoxy alkane (PFA), polytetrafluoroethylene (PTFE), and an ethylene-tetrafluoroethylene copolymer (ETFE), and materials obtained by applying an acrylic pressure-sensitive adhesive, a urethane acrylate pressure-sensitive adhesive, a rubber pressure-sensitive adhesive, a silicone pressure-sensitive adhesive or the like to the above-mentioned materials to improve adhesion to an adherend. A material having improved adhesion also provides an effect of preventing the electrolyte membrane from swelling because the material can support the electrolyte membrane while the electrolyte membrane is in contact with the liquid.

To the membrane-first catalyst layer assembly 16 supplied to the thermocompression bonding section P, the second catalyst layer is thermocompression-bonded as a catalyst layer-formed gas diffusion layer in a state where the first catalyst layer is covered with the cover film by the liquid application step and the thermocompression bonding step similar to those in the first embodiment to form a membrane-electrode assembly 13c.

The membrane-electrode assembly 13c that has passed through the thermocompression bonding section P is wound into a roll by a take-up roll 15. The membrane-electrode assembly 13c may be wound up with the cover film 61 bonded thereto, or the cover film 61 may be separated from the membrane-electrode assembly 13c with a hot press roll 40B immediately after pressing. When the membrane-electrode assembly 13c is wound up with the cover film 61 bonded thereto, it is possible to prevent wrinkles and elongation of the catalyst layer-formed electrolyte membrane, and to protect the catalyst layer from physical damages due to external factors. Further, when the cover film 61 is separated immediately after thermocompression bonding and the catalyst layer is exposed, it is possible to effectively discharge the liquid vapor generated in the thermocompression bonding step. In this case, the catalyst layer can be protected with a new cover film before the membrane-electrode assembly 13c is wound up.

In this state, no gas diffusion layer is on the surface of the first catalyst layer formed on the electrolyte membrane, and it is possible to add a function, for example, by sandwiching a film cut in frame shape before further bonding a gas diffusion layer. Alternatively, an MEA in sheet shape can be made as follows: an electrolyte membrane having the first catalyst layer formed thereon and having no gas diffusion layer on the catalyst layer surface is cut to desired dimensions, and is further bonded to a frame-shaped film material or a gas diffusion layer. Furthermore, the gas diffusion layer may be laminated through a series of steps as follows: a catalyst solution for forming a first catalyst layer is applied to an electrolyte membrane; the catalyst layer is coated with a gas diffusion layer before being dried; and the catalyst layer is dried through the gas diffusion layer.

Third Embodiment

Manufacture of Membrane-Electrode Assembly—3

In the third embodiment, first, a first catalyst layer-formed gas diffusion layer is formed on one surface of an electrolyte membrane using a device 103 for manufacturing a membrane-electrode assembly according to an embodiment shown in FIG. 4. The first catalyst layer-formed gas diffusion layer is formed as follows.

In this embodiment, an electrolyte membrane 10' in a state of being supported on a support is supplied to the catalyst layer forming apparatus 103. The electrolyte membrane 10' with the support is unwound from an electrolyte membrane supply roll 11, and supplied to a thermocompression bonding section P. To the electrolyte membrane 10' supplied to the thermocompression bonding section P, the first catalyst layer-formed gas diffusion layer is thermocompression-bonded by the liquid application step and the thermocompression bonding step similar to those in the first embodiment to form a membrane-first catalyst layer assembly 16'.

The membrane-first catalyst layer-formed gas diffusion layer assembly 16' including the support is fed by a feeding roll 14 and wound into a roll by a take-up roll 17.

Then, a second catalyst layer is formed on a surface of the electrolyte membrane reverse to the surface on which the first catalyst layer-formed gas diffusion layer is formed using a catalyst layer forming apparatus 104 according to an embodiment shown in FIG. 5. The second catalyst layer is formed as follows.

The membrane-first catalyst layer assembly 16' is unwound from a supply roll 18, and a support 51 is separated from the interface with the electrolyte membrane via guide rolls 26A and 26B. The support 51 separated in this process is wound on a support take-up roll 50.

On the membrane-first catalyst layer-formed gas diffusion layer assembly 16' from which the support 51 has been separated, the second catalyst layer is formed by a catalyst solution coater 72 and a dryer 74 similar to those in the third embodiment to form a membrane-electrode assembly 13d.

The membrane-electrode assembly 13d is fed by a feeding roll 14 and wound into a roll by a take-up roll 15.

In this state, no gas diffusion layer is on the surface of the second catalyst layer formed on the electrolyte membrane, and it is possible to add a function, for example, by sandwiching a film cut in frame shape before further bonding a gas diffusion layer. Alternatively, an MEA in sheet shape can be made as follows: an electrolyte membrane having the second catalyst layer formed thereon and having no gas diffusion layer on the catalyst layer surface is cut to desired dimensions, and is further bonded to a frame-shaped film material or a gas diffusion layer.

EXAMPLES

Hereinafter, the present invention will be more specifically described with reference to Examples, but the present invention is not limited to these Examples.

In Examples 1 to 6, a catalyst layer-formed gas diffusion layer roll (width of base material: 100 mm, thickness: 240 μm) was used as a catalyst layer-formed gas diffusion layer. The catalyst layer-formed gas diffusion layer roll was obtained by applying, to a gas diffusion layer 28BC (manufactured by SGL Carbon GmbH) as a base material, a catalyst coating liquid containing a Pt-supported carbon catalyst TEC10E50E manufactured by Tanaka Kikinzoku Kogyo K.K. and a "Nafion" (registered trademark) solution, then drying the catalyst coating liquid to give a catalyst layer-formed gas diffusion layer, and forming the catalyst layer-formed gas diffusion layer into a roll (amount of supported platinum: 0.3 mg/cm$^2$).

The electrolyte membranes of Examples 2 to 6 were manufactured with reference to the manufacturing method described in Japanese Patent Laid-open Publication No. 2018-60789.

Example 1

Using a device having the schematic configuration shown in FIG. 1, the catalyst layer of the above-mentioned catalyst layer-formed gas diffusion layer was bonded to one surface of a commercially available "Nafion" (registered trademark) membrane, trade name NR211 (thickness: 25 μm) used as an electrolyte membrane, according to the method described in the above-mentioned first embodiment.

In the liquid application step, 100% pure water was applied to the catalyst layer in a droplet form in an amount of 0.4 μL per 1 cm² using a flat spray nozzle CBIMV 80005S manufactured by H. IKEUCHI & CO., LTD.

In the thermocompression bonding step, a pair of hot press rolls each having a diameter of 250 mm was used. One of the rolls was a stainless steel roll, and the other roll was a fluororubber roll having a hardness of 90° (Shore A). The hot press rolls applied a pressure of 3.0 MPa. The pressure is a value measured using a Prescale film manufactured by FUJIFILM Corporation. The rolls had a surface temperature of 160° C., and the heating temperature measured with a thermocouple provided at the joint interface was found to be 115° C. The electrolyte membrane and the catalyst layer-formed gas diffusion layer were transported at a transport speed of 4.0 m/min.

As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

Example 2

Using a device having the schematic configuration shown in FIG. 1, the catalyst layer of the same catalyst layer-formed gas diffusion layer as the one used in Example 1 was bonded to one surface of a polyetherketone-based polymer electrolyte membrane made of a polymer represented by the following formula (G1), according to the method described in the above-mentioned first embodiment.

[Chemical Formula 1]

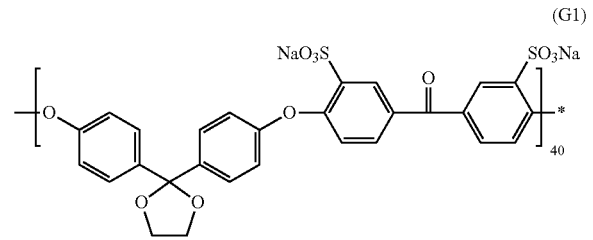

(G1)

[Chemical Formula 2]

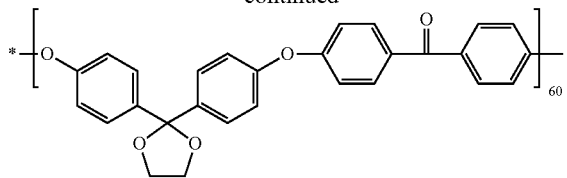

In the liquid application step, 100% pure water was applied to the catalyst layer in an amount of 0.4 μL per 1 cm² using a flat spray nozzle CBIMV 80005S manufactured by H. IKEUCHI & CO., LTD.

In the thermocompression bonding step, a pair of hot press rolls each having a diameter of 250 mm was used. One of the rolls was a stainless steel roll, and the other roll was a fluororubber roll having a hardness of 90° (Shore A). The hot press rolls applied a pressure of 4.8 MPa. The pressure is a value measured using a Prescale film manufactured by FUJIFILM Corporation. The rolls had a surface temperature of 160° C., and the heating temperature measured with a thermocouple provided at the joint interface was found to be 115° C. The electrolyte membrane and the catalyst layer-formed gas diffusion layer were transported at a transport speed of 4.0 m/min.

As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

Example 3

Using a device having the schematic configuration shown in FIG. 1, the catalyst layer of the above-mentioned catalyst layer-formed gas diffusion layer was bonded to one surface of a polyarylene-based polymer electrolyte membrane made of a polymer represented by the following formula (G2), according to the method described in the above-mentioned first embodiment.

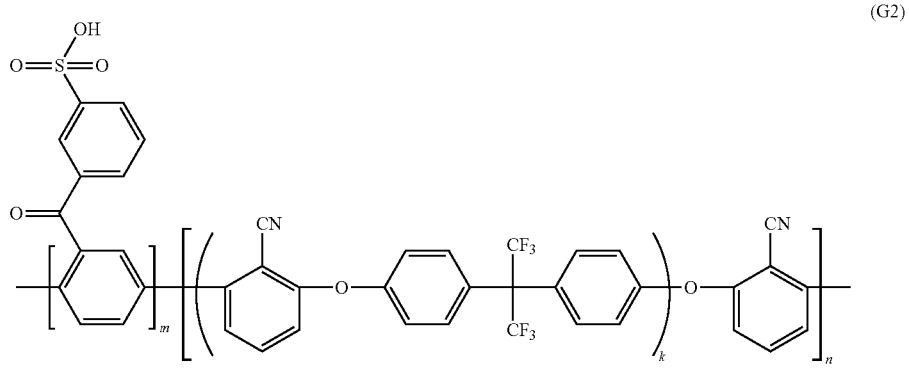

(G2)

(In the formula (G2), k, m, and n are integers, and k is 25, m is 380, and n is 8.)

The liquid application step and the thermocompression bonding step were performed in the same manner as in Example 2.

As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

Example 4

Using a device having the schematic configuration shown in FIG. 1, the catalyst layer of the above-mentioned catalyst layer-formed gas diffusion layer was bonded to one surface of a polyethersulfone-based polymer electrolyte membrane including a segment represented by the following formula (G3) and a segment represented by the following formula (G4), according to the method described in the above-mentioned first embodiment.

[Chemical Formula 3]

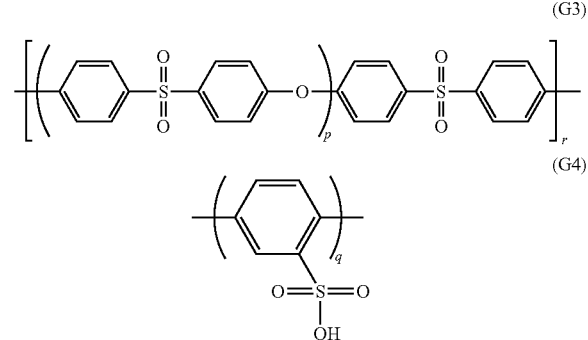

(In the formulae (G3) and (G4), p, q, and r are integers, and p is 170, q is 380, and r is 4.)

The liquid application step and the thermocompression bonding step were performed in the same manner as in Example 2.

As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

Example 5

A membrane-electrode assembly was manufactured according to the method described in the above-mentioned second embodiment.

Using an apparatus having the schematic configuration shown in FIG. 2, a catalyst solution was applied to one surface of the polyetherketone-based polymer electrolyte membrane made of the polymer represented by the formula (G1), and the catalyst solution was dried to form a first catalyst layer. The catalyst solution used was a catalyst coating liquid containing a Pt-supported carbon catalyst TEC10E50E manufactured by Tanaka Kikinzoku Kogyo K.K. and a "Nafion" (registered trademark) solution. The catalyst solution was dried at 120° C. for 5 minutes to give a catalyst layer having a thickness of 5 μm.

Then, using a device having the schematic configuration shown in FIG. 3, the catalyst layer of the catalyst layer-formed gas diffusion layer was bonded to the other surface of the polyetherketone-based polymer electrolyte membrane having the first catalyst layer thereon to form a second catalyst layer-formed gas diffusion layer. A cover film to be laminated on the first catalyst layer surface was "Lumirror" (registered trademark), a PET film manufactured by TORAY INDUSTRIES, INC. and having a thickness of 75 μm. The liquid application step and the thermocompression bonding step were performed by a method similar to that in Example 2.

When the cover film was separated from the obtained membrane-electrode assembly, no deposits or the like were observed on the cover film. Additionally, as a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

Example 6

A membrane-electrode assembly was manufactured according to the method described in the above-mentioned third embodiment.

Using a device having the schematic configuration shown in FIG. 4, the first catalyst layer was bonded layer from the above-mentioned catalyst layer-formed gas diffusion layer to one surface of the polyetherketone-based polymer electrolyte membrane made of the polymer represented by the formula (G1). The liquid application step and the thermocompression bonding step were performed by a method similar to that in Example 2.

Then, using an apparatus having the schematic configuration shown in FIG. 5, a catalyst solution similar to that of Example 5 was applied to the other surface of the electrolyte membrane having the first catalyst layer-formed gas diffusion layer, and the catalyst solution was dried to form a second catalyst layer.

As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

Example 7

A membrane-electrode assembly was manufactured in the same manner as in Example 1 except that the below-mentioned composite electrolyte membrane was used as the electrolyte membrane. As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

<Composite Electrolyte Membrane>

A composite electrolyte membrane obtained by impregnating a PTFE porous base material ("TETRATEX" (registered trademark) manufactured by Donaldson Company, Inc.) having a thickness of 6 μm with the below-mentioned fluorine-based electrolyte solution.

<Fluorine-Based Electrolyte Solution>

To 100 parts by mass of n-propanol solution of 20% "Nafion (registered trademark)", 80 parts by mass of ethylene glycol was added and n-propanol was removed under reduced pressure to replace the solvent, so that an ethylene glycol solution of "Nafion" was obtained.

Example 8

A membrane-electrode assembly was manufactured in the same manner as in Example 5 except that the below-mentioned composite electrolyte membrane was used as the electrolyte membrane. As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.
<Composite Electrolyte Membrane>
A composite electrolyte membrane obtained by impregnating a PTFE porous base material ("TETRATEX" (registered trademark) manufactured by Donaldson Company, Inc.) having a thickness of 6 μm with the below-mentioned hydrocarbon-based electrolyte solution.
<Hydrocarbon-Based Electrolyte Solution>
A polyetherketone-based polymer electrolyte represented by the above-mentioned formula (G1) was dissolved in N-methylpyrrolidone (NMP), and in 100 parts by mass of the NMP solution (having an electrolyte concentration of 13 mass %), 0.26 part by mass of nonionic fluorosurfactant (polyoxyethylene ether-based surfactant "Ftergent" (registered trademark) FTX-218 manufactured by Neos Company Limited) was dissolved to prepare a solution.

Example 9

In the manufacturing device depicted in FIG. 1, a membrane-electrode assembly was produced in the same manner as in Example 1 except that the pressure in the nozzle chambers 32A and 32B were not reduced. As a result of visual evaluation of the obtained membrane-electrode assembly, it was found that there was no damage to the catalyst layer-formed gas diffusion layer nor swelling or wrinkles of the electrolyte membrane, and the membrane-electrode assembly was of high quality.

Comparative Example 1

The catalyst layer was bonded from the same catalyst layer-formed gas diffusion layer as that used in Example 1 to one surface of an electrolyte membrane in the same manner as in Example 2 except that the liquid application step was not performed. As a result of visual evaluation of the obtained membrane-electrode assembly, adhesion failure was observed between the electrolyte membrane and the catalyst layer.

INDUSTRIAL APPLICABILITY

A membrane-electrode assembly of the present invention can be used, for example, for a polymer electrolyte fuel cell, solid polymer electrolyte membrane water electrolyzer, electrochemical hydrogen pump, or the like.

DESCRIPTION OF REFERENCE SIGNS 100, 102, 103: Device for manufacturing membrane-electrode assembly
101, 104: Catalyst layer forming apparatus
10, 10': Electrolyte membrane
11, 18: Electrolyte membrane supply roll
13a, 13b, 13c, 13d: Membrane-electrode assembly
14: Feeding roll
15, 17: Take-up roll
16: Membrane-first catalyst layer assembly
16': Membrane-first catalyst layer-formed gas diffusion layer assembly
12, 22A, 22B, 26A, 26B, 27A, 27B: Guide roll
20A, 20B: Catalyst layer-formed gas diffusion layer
21A, 21B: Catalyst layer-formed gas diffusion layer supply roll
30A, 30B: Spray nozzle
31A, 31B, 73: Backup roll
32A, 32B: Nozzle chamber
33A, 33B: Valve
34A, 34B: Pressure reducing tank
40A, 40B: Hot press roll
41A, 41B: Heat shield plate
50: Support take-up roll
51: Support
60: Cover film supply roll
70: Catalyst solution tank
71: Catalyst solution feeding pump
72: Coater
74: Dryer
P: Thermocompression bonding section
S: Space

The invention claimed is:

1. A method of manufacturing a membrane-electrode assembly including an electrolyte membrane and a catalyst layer-formed gas diffusion layer bonded to said electrolyte membrane, the method comprising:
a liquid application step of applying, in the atmosphere, a liquid to only a surface of a first catalyst layer-formed gas diffusion layer while the first catalyst layer-formed gas diffusion layer is continuously conveyed; and subsequently
a bonding step of thermocompression bonding said first catalyst layer-formed gas diffusion layer to a first surface of said electrolyte membrane while the electrolyte membrane and the first catalyst layer-formed gas diffusion layer are continuously conveyed,
wherein in the bonding step, the catalyst layer-formed gas diffusion layer comes into contact with the electrolyte membrane at substantially the same time as the compression force acts on the catalyst layer-formed gas diffusion layer and the electrolyte membrane.

2. The method of manufacturing a membrane-electrode assembly according to claim 1, wherein said liquid applied in said liquid application step is a water-containing liquid.

3. The method of manufacturing a membrane-electrode assembly according to claim 2, wherein said water-containing liquid contains water at a content rate of 50 mass % or more and 100 mass % or less.

4. The method of manufacturing a membrane-electrode assembly according to claim 3, wherein said liquid applied in said liquid application step is pure water.

5. The method of manufacturing a membrane-electrode assembly according to claim 1, wherein, in said liquid application step, said liquid is applied to said surface of said catalyst layer of said catalyst layer-formed gas diffusion layer, in a droplet form.

6. The method of manufacturing a membrane-electrode assembly according to claim 5, wherein, in said liquid application step, said liquid is applied with a sprayer.

7. The method of manufacturing a membrane-electrode assembly according to claim 1, wherein, in said liquid application step, said liquid is applied so that the amount of said liquid in said thermocompression bonding step is 0.1 μL or more and 5 μL or less per 1 cm² of the surface of said catalyst layer.

8. The method of manufacturing a membrane-electrode assembly according to claim 1, wherein said electrolyte membrane is a hydrocarbon-based electrolyte membrane.

9. A method of manufacturing a membrane-electrode assembly according to claim 1, which further comprises:
 a liquid application step of applying, in the atmosphere, a liquid to only a surface of a second catalyst layer-formed gas diffusion layer while the second catalyst layer-formed gas diffusion layer is continuously conveyed; and subsequently
 a bonding step of thermocompression bonding said second catalyst layer-formed gas diffusion layer to a second surface of said electrolyte membrane while the electrolyte membrane and the second catalyst layer-formed gas diffusion layer are continuously conveyed, wherein in the bonding step, the time from when the second catalyst later-formed gas diffusion layer comes into contact with the electrolyte membrane at substantially the same time as the compression force acts on the second catalyst later-formed gas diffusion layer and the electrolyte membrane.

10. A method of manufacturing a membrane-electrode assembly, comprising the steps of:
 bonding the first catalyst layer-formed gas diffusion layer to the first surface of said electrolyte membrane by the method according to claim 1;
 applying a second catalyst solution to a second surface of said electrolyte membrane and drying said second catalyst solution to form a second catalyst layer;
 a liquid application step of applying, in the atmosphere, a liquid to only a surface of a third catalyst layer while the third catalyst layer is continuously conveyed to form a third catalyst layer-formed gas diffusion layer; and
 laminating said third catalyst layer-formed gas diffusion layer on the surface of said second catalyst layer.

11. A method of manufacturing a membrane-electrode assembly including an electrolyte membrane and a catalyst layer-formed gas diffusion layer bonded to said electrolyte membrane, the method comprising:
 a liquid application step of applying, in the atmosphere, a liquid to only a surface of a first catalyst layer-formed gas diffusion layer while the first catalyst layer-formed gas diffusion layer is continuously conveyed; and subsequently
 a bonding step of thermocompression bonding said first catalyst layer-formed gas diffusion layer to a first surface of said electrolyte membrane while the electrolyte membrane and the first catalyst layer-formed gas diffusion layer are continuously conveyed, wherein in the bonding step, the first catalyst later-formed gas diffusion layer comes into contact with the electrolyte membrane at a time of 0.1 seconds or less before the compression force acts on the first catalyst layer-formed gas diffusion layer and the electrolyte membrane.

12. A method of manufacturing a membrane-electrode assembly according to claim 1, which further comprises:
 a liquid application step of applying, in the atmosphere, a liquid to only a surface of a second catalyst layer-formed gas diffusion layer while the second catalyst layer-formed gas diffusion layer is continuously conveyed; and subsequently
 a bonding step of thermocompression bonding said second catalyst layer-formed gas diffusion layer to a second surface of said electrolyte membrane while the electrolyte membrane and the second catalyst layer-formed gas diffusion layer are continuously conveyed, wherein in the bonding step, the second catalyst later-formed gas diffusion layer comes into contact with the electrolyte membrane at substantially the same time as the compression force acts on the second catalyst layer-formed gas diffusion layer and the electrolyte membrane.

\* \* \* \* \*